United States Patent
Gupta et al.

(10) Patent No.: US 12,047,275 B2
(45) Date of Patent: Jul. 23, 2024

(54) EFFICIENCY AND QUALITY OF SERVICE IMPROVEMENTS FOR SYSTEMS WITH HIGHER BANDWIDTH CLIENTS MIXED WITH LOWER BANDWIDTH CLIENTS

(71) Applicant: XILINX, INC., San Jose, CA (US)

(72) Inventors: Aman Gupta, Sunnyvale, CA (US); Jaideep Dastidar, San Jose, CA (US); Jeffrey Cuppett, Los Altos, CA (US); Sagheer Ahmad, Cupertino, CA (US)

(73) Assignee: XILINX, INC., San Jose, CA (US)

( * ) Notice: Subject to any disclaimer, the term of this patent is extended or adjusted under 35 U.S.C. 154(b) by 203 days.

(21) Appl. No.: 17/705,087

(22) Filed: Mar. 25, 2022

(65) Prior Publication Data

US 2023/0308384 A1  Sep. 28, 2023

(51) Int. Cl.
*H04L 45/24* (2022.01)
*H04L 45/74* (2022.01)
*H04L 49/109* (2022.01)

(52) U.S. Cl.
CPC .............. *H04L 45/24* (2013.01); *H04L 45/74* (2013.01); *H04L 49/109* (2013.01)

(58) Field of Classification Search
None
See application file for complete search history.

(56) References Cited

U.S. PATENT DOCUMENTS

| | | | | |
|---|---|---|---|---|
| 5,164,938 A | * | 11/1992 | Jurkevich | H04J 3/1682 370/231 |
| 5,557,611 A | * | 9/1996 | Cappellari | H04L 12/5602 370/414 |
| 5,974,480 A | * | 10/1999 | Qureshi | G06F 13/28 710/27 |
| 8,310,926 B1 | * | 11/2012 | Bernstein | H04L 12/2801 370/468 |
| 8,937,865 B1 | * | 1/2015 | Kumar | H04L 43/0876 370/235 |
| 10,963,421 B1 | | 3/2021 | Swarbrick | |

(Continued)

FOREIGN PATENT DOCUMENTS

| | | |
|---|---|---|
| CN | 113452432 A | 9/2021 |
| EP | 1928115 A1 | 6/2008 |
| WO | 9925088 A1 | 5/1999 |

OTHER PUBLICATIONS

International Search Report and Written Opinion for PCT/US2023/011565 dated May 2, 2023.

*Primary Examiner* — Lonnie V Sweet
(74) *Attorney, Agent, or Firm* — Patterson + Sheridan, LLP

(57) ABSTRACT

Methods and apparatus relating to transmission on physical channels, such as in networks on chips (NoCs) or between chiplets, are provided. One example apparatus generally includes a higher bandwidth client; a lower bandwidth client; a first destination; a second destination; and multiple physical channels coupled between the higher bandwidth client, the lower bandwidth client, the first destination, and the second destination, wherein the higher bandwidth client is configured to send first traffic, aggregated across the multiple physical channels, to the first destination and wherein the lower bandwidth client is configured to send second traffic, concurrently with sending the first traffic, from the lower bandwidth client, dispersed over two or more of the multiple physical channels, to the second destination.

20 Claims, 9 Drawing Sheets

(56) References Cited

U.S. PATENT DOCUMENTS

| | | | |
|---|---|---|---|
| 2007/0019603 A1* | 1/2007 | Gerhardt | H04B 1/7143 375/E1.035 |
| 2008/0112323 A1* | 5/2008 | Agmon | H04L 12/4625 370/386 |
| 2012/0008503 A1* | 1/2012 | Qiu | H04L 45/00 370/238 |
| 2014/0140210 A1* | 5/2014 | Liu | H04L 47/12 370/233 |
| 2014/0327576 A1 | 11/2014 | Kumar | |
| 2015/0188847 A1* | 7/2015 | Chopra | H04L 45/306 370/401 |
| 2019/0028185 A1* | 1/2019 | Tomasicchio | H04B 7/2041 |
| 2021/0114616 A1* | 4/2021 | Altman | G01C 21/3889 |
| 2022/0052970 A1* | 2/2022 | Radi | H04L 45/24 |
| 2022/0070089 A1* | 3/2022 | Brewer | H04L 45/586 |
| 2022/0417206 A1* | 12/2022 | Christidis | G06F 12/1458 |
| 2023/0281875 A1* | 9/2023 | Funnell | G06T 9/00 382/236 |

\* cited by examiner

EFFICIENCY AND QUALITY OF SERVICE IMPROVEMENTS FOR SYSTEMS WITH HIGHER BANDWIDTH CLIENTS MIXED WITH LOWER BANDWIDTH CLIENTS

TECHNICAL FIELD

Examples of the present disclosure generally relate to intra-device network routing in electronic devices, and more particularly, to communications mixed between higher and lower bandwidth clients in an electronic device.

BACKGROUND

Electronic systems, programmable systems (e.g., central processing units (CPUs)), and programmable logic (PL)-based systems can be used in various data processing environments. Systems of these types may use a network on a chip (NoC, also referred to herein as a "horizontal network on chip (HNoC)") to transfer data between components. As devices now support high bandwidth (BW) interfaces like 1 terabit per second (Tbps) Peripheral Component Interface Express (PCIe) interfaces, 800 gigabit per second (Gbps) Ethernet, and high bandwidth memories, NoCs have increased their supported bandwidths.

SUMMARY

Examples described herein generally relate to transmission on physical channels and methods that enable a higher bandwidth client to transmit traffic, aggregated across multiple physical channels, to a destination and enable a lower bandwidth client to concurrently transmit traffic, dispersed over two or more of the multiple physical channels, to the same or a different destination, without causing an asymmetric impact to the aggregated communication from the higher bandwidth client.

In one example, a method of transmission is provided. The method includes sending first traffic from a higher bandwidth client, aggregated across multiple physical channels, to a first destination; and concurrently with sending the first traffic, sending second traffic from a lower bandwidth client, dispersed over two or more of the multiple physical channels, to a second destination.

In another example, an apparatus is provided. The apparatus generally includes a higher bandwidth client; a lower bandwidth client; a first destination; a second destination; and multiple physical channels coupled between the higher bandwidth client, the lower bandwidth client, the first destination, and the second destination, wherein the higher bandwidth client is configured to send first traffic, aggregated across the multiple physical channels, to the first destination and wherein the lower bandwidth client is configured to send second traffic, concurrently with sending the first traffic, from the lower bandwidth client, dispersed over two or more of the multiple physical channels, to the second destination.

In yet another example, an apparatus is provided. The apparatus generally includes means for sending first traffic from a higher bandwidth client, aggregated across multiple physical channels, to a first destination; and means for sending, concurrently with sending the first traffic, second traffic from a lower bandwidth client, dispersed over two or more of the multiple physical channels, to a second destination.

These and other aspects may be understood with reference to the following detailed description.

BRIEF DESCRIPTION OF THE DRAWINGS

So that the manner in which the above-recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
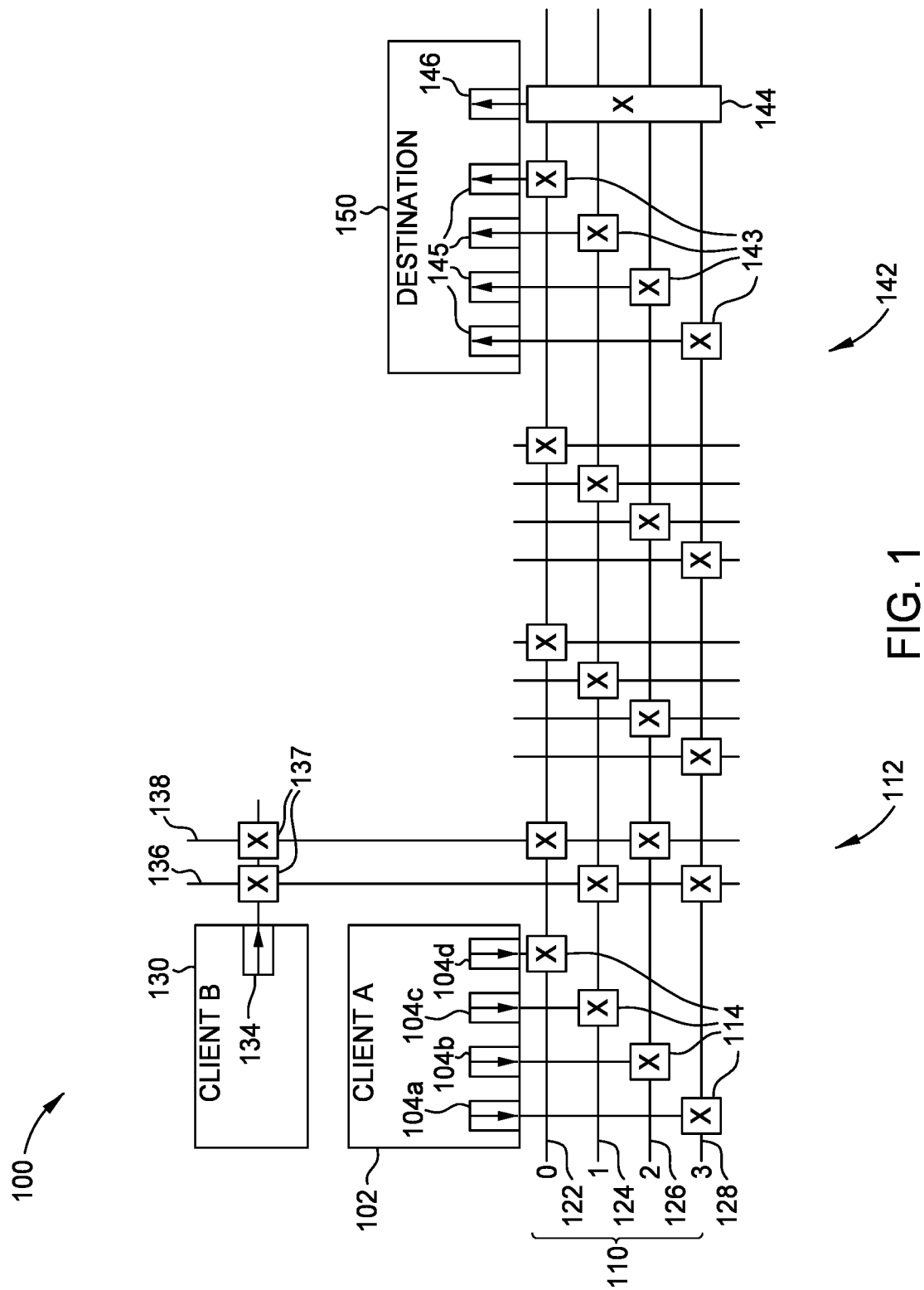
FIG. 1 shows an example system including a fully subscribed link aggregated communication, in which examples of the present disclosure may be practiced.

Examples of the present disclosure provide methods and apparatus for enabling a higher bandwidth client to transmit traffic, aggregated across multiple physical channels, to a destination and enabling a lower bandwidth client to concurrently transmit traffic, dispersed over two or more of the multiple physical channels, to the same or a different destination, without causing an asymmetric impact to the aggregated communication from the higher bandwidth client. This may improve network-on-chip (NoC) throughput and quality of service (QOS) in electronic and programmable logic systems with higher bandwidth clients mixed with lower bandwidth clients. In this manner, higher bandwidth clients and lower bandwidth clients can communicate with their respective destination(s) without the traffic of the lower bandwidth clients asymmetrically impacting the traffic of the higher bandwidth clients.

In some NoCs with multiple physical channels, a higher bandwidth ("aggregated") client may be mapped to all of the multiple physical channels to supply bandwidth requested by the higher bandwidth client for communications with a first destination. A lower bandwidth ("non-aggregated") client may also be mapped (e.g., allocated) to one of the available physical channels to supply bandwidth for that lower bandwidth client's communications with a second destination. This allocation of a lower bandwidth client to a single physical channel that is also mapped to a higher bandwidth client's communications may lead to NoC inefficiency. In addition, the "noisy neighbor" effect of the lower bandwidth client's communications impacting the higher bandwidth client's communications may cause the NoC to have difficulty meeting quality of service (QOS) standards for the higher bandwidth client's communications.

In examples of the present disclosure, a NoC having a fully subscribed aggregated channel between a higher bandwidth client and a first destination may route traffic from a lower bandwidth client across the multiple aggregated channels by mapping multiple logical destination identifiers (IDs) to a physical destination ID for a second destination (which may be the same destination as the first destination or a different destination), configuring a route for each of the multiple logical destination IDs on a different one of the physical channels, and dividing traffic to the physical destination ID among the logical destination IDs so that the traffic is divided among the physical channels and does not asymmetrically affect the fully subscribed aggregated channel. By using a single physical destination ID that is mapped to the multiple logical destination IDs, the traffic of the lower bandwidth client is divided among the multiple channels, and the lower bandwidth client can avoid the implementation complexity of distribution and/or destination aggregation, which is instead provided by the NoC performing the techniques described herein (e.g., mapping multiple logical destination IDs to the single physical destination ID). Further details are provided below with respect to FIGS. 1-9.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described. Further, methods described herein may be described in a particular order of operations, but other methods according to other examples may be implemented in various other orders (e.g., including different serial or parallel performance of various operations) with more or fewer operations.

In the description that follows, the phrase "aggregated bandwidth client" refers to a computing component that is communicating with a destination via multiple physical channels of a NoC and utilizing more bandwidth for that communication than can be carried by a single physical channel.

Performance specifications for on-chip data movement have been increasing, as devices now support high-bandwidth (BW) interfaces like 1 terabit-per-second (Tbps) Peripheral Control Interface Express (PCIe) generation 6 (Gen6), high speed input/output (IO), and 800 gigabit-per-second (Gbps) Ethernet, and support high BW memories like HBM3 at 800 Gbps. Some devices use a hardened NoC to route such high-speed traffic and support various traffic profiles, such as streaming or memory mapped traffic, in some cases concurrently. Streaming traffic on a NoC may frequently be mapped between a source and destination pair and can involve a fully subscribed aggregated communication.

An example of a fully subscribed aggregated communication may be as follows: a first client (e.g., a higher bandwidth client) may be bandwidth-sensitive (e.g., a streaming video client) and connected to one end of a horizontal NoC with physical proximity to an external interface, such as a PCIe interface. In this example, a first destination may be at another end of the horizontal NoC with physical proximity to another external interface, such as an Ethernet interface. In this example, the first client is communicating with the first destination utilizing 99.5% of the total available bandwidth of the horizontal NoC. In this example, the horizontal NoC may be constructed of 4 physical channels or links that each support 25% of the bandwidth supplied by the horizontal NoC. In this example, the first client may use 4 network master units (NMUs), each connected to one of the physical channels, to utilize 99.5% of the bandwidth of each link, and thus utilize 99.5% of the total bandwidth of the horizontal NoC.

In the example above, if a second client (e.g., a lower bandwidth client) also wishes to communicate with a second destination (the same or different from the first destination) using a small amount of the total bandwidth of the horizontal NoC, then, in a typical NoC architecture, the routing algorithm of the NoC would pick the shortest path for this traffic and route all of this traffic on one channel. Because the first client is already sending traffic to consume 99.5% of the bandwidth of each channel, the traffic from the second client will impact one of the four channels carrying the first client's traffic. This selection of a single channel will affect the equal distribution of the bandwidth across the 4 links for the first client to the first destination, resulting in an asymmetric impact to the network traffic from the first client to the first destination. The NoC channel carrying the traffic for the second client would provide lower performance between the first client and the first destination than the remaining three channels.

FIG. 1 shows an example system 100 including a fully subscribed link aggregated communication. In the system 100, client A 102 is a bandwidth-sensitive client (e.g., client A 102 is executing a bandwidth-sensitive application) and may be referred to herein as a "higher bandwidth client." Client A 102 may be connected to a first location 112 (e.g., one end) of a horizontal NoC 110 via network protocol switches (NPSs, also referred to herein as "switches") 114. Client A 102 may have physical proximity to its external interface, which may be, for example, a PCIe interface. A destination 150 may be located at a second location 142 (e.g., at the other end) of the horizontal NoC 110 and connected to the horizontal NoC via network protocol switches (NPSs) 143 and 144. The NPSs 114, 143, and 144, and/or other NPSs referred to herein, may be configured to store routing information and/or routing tables describing routes for network traffic between the various NPSs and other components (e.g., client A 102 and destination 150) of the system 100. The destination 150 may have physical proximity to its external interface, which may be, for example, an Ethernet interface. Client A 102 may communicate with the destination 150 and may consume most all (e.g., 99.5%) of the total available bandwidth of the horizontal NoC 110.

In the example of FIG. 1, the horizontal NoC (HNoC) is constructed out of four physical channels 122, 124, 126, and 128 (also referred to herein as "links" and labeled as channels "0," "1," "2," and "3," respectively), each supporting 25% of the total available bandwidth. Although four physical channels are shown, the reader is to understand that the HNoC may include more or less than four channels.

Client A 102 has four source ports (e.g., four network master units (NMUs) 104a-d), and each NMU 104a-d is connected to a different physical channel, 122, 124, 126, or 128, respectively, via one of the NPSs 114. In this example, client A 102 would prefer to consume 99.5% of the available bandwidth of each physical channel in order to consume a total of 99.5% of the available bandwidth across all four physical channels 122, 124, 126, and 128. This communication (which is consuming nearly all of the available bandwidth of each of multiple physical channels) may be referred to herein as a "fully subscribed link aggregated communication." In order to get the best distribution of available bandwidth, client A 102 may also choose to distribute a single logical traffic flow across the four physical channels 122, 124, 126, and 128. In the system 100, client B 130 is a lower bandwidth client that can consume a small quantity (e.g., 2%) of the available bandwidth. Client B 130 has a source port (e.g., a network master unit (NMU) 134) that is a network ingress point of the NoC 110 and is connected to the physical channels 122, 124, 126, and 128 via NPSs 137 and via physical channels 136 and 138 of a vertical NoC. Destination ports (e.g., network slave units (NSUs) 145 and NSU 146) are network egress points of the NoC 110 and connect the destination 150 to the horizontal NoC 110 via the NPSs 143 and 144, as illustrated.

Figure 2:
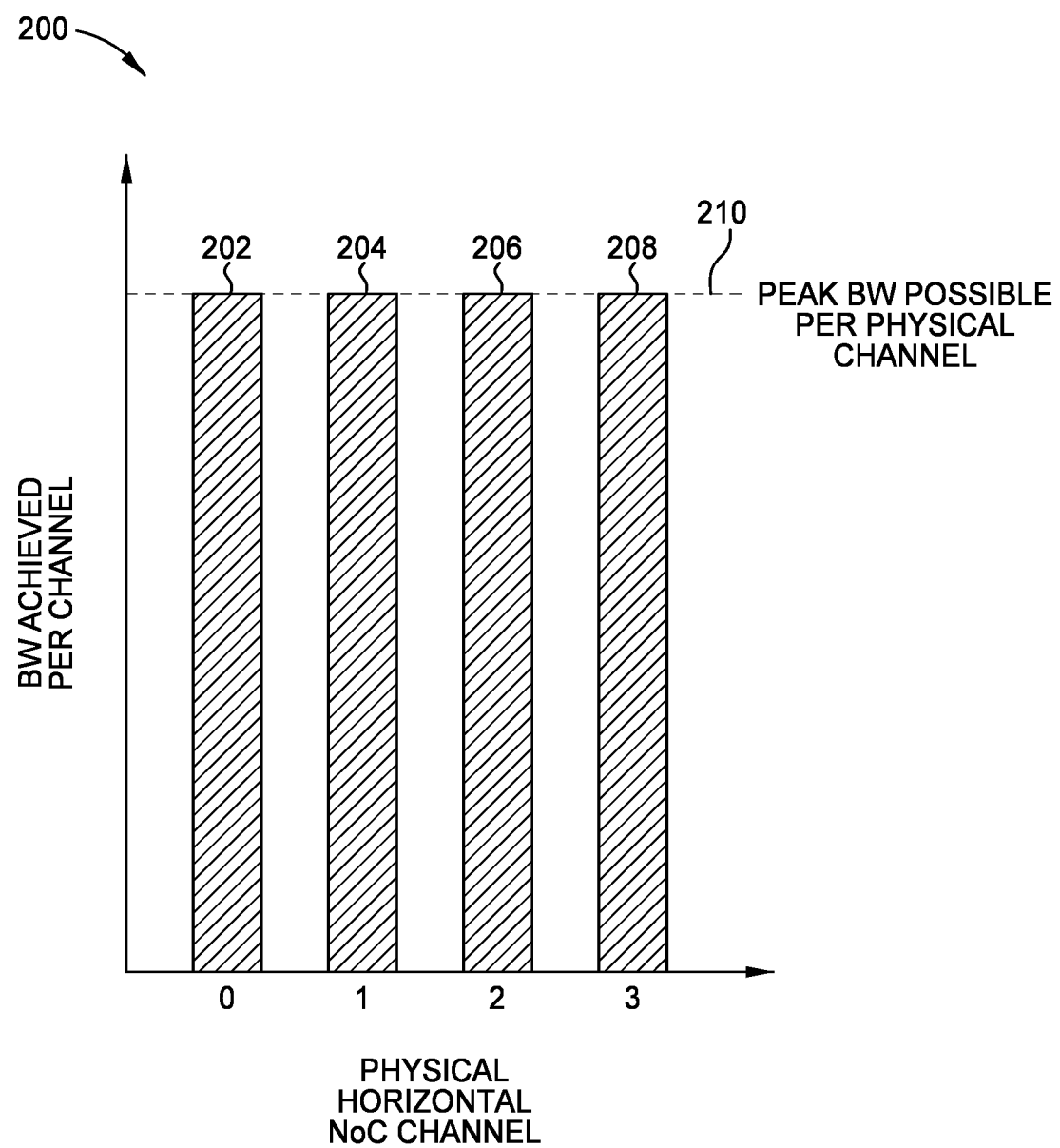
FIG. 2 shows a traffic distribution graph of the system shown in FIG. 1 with no perturbation traffic.

FIG. 2 shows a traffic distribution graph 200 from client A 102 (see FIG. 1) on the four horizontal NoC physical channels 122, 124, 126, and 128, in accordance with an example of the present disclosure. As illustrated in FIG. 1, there is no traffic from client B 130, and thus no traffic from client B 130 is shown in the traffic distribution graph 200. The bandwidth achieved by the horizontal NoC physical channel 122 is shown at 202. Similarly, the bandwidths achieved by the horizontal NoC physical channels 124, 126, and 128 are shown at 204, 206, and 208, respectively. As illustrated, each of the channels 122, 124, 126, and 128 can use close to its peak bandwidth 210, such as 99.5% of the peak bandwidth 210, without any perturbation traffic (e.g., from client B 130).

Figure 3:
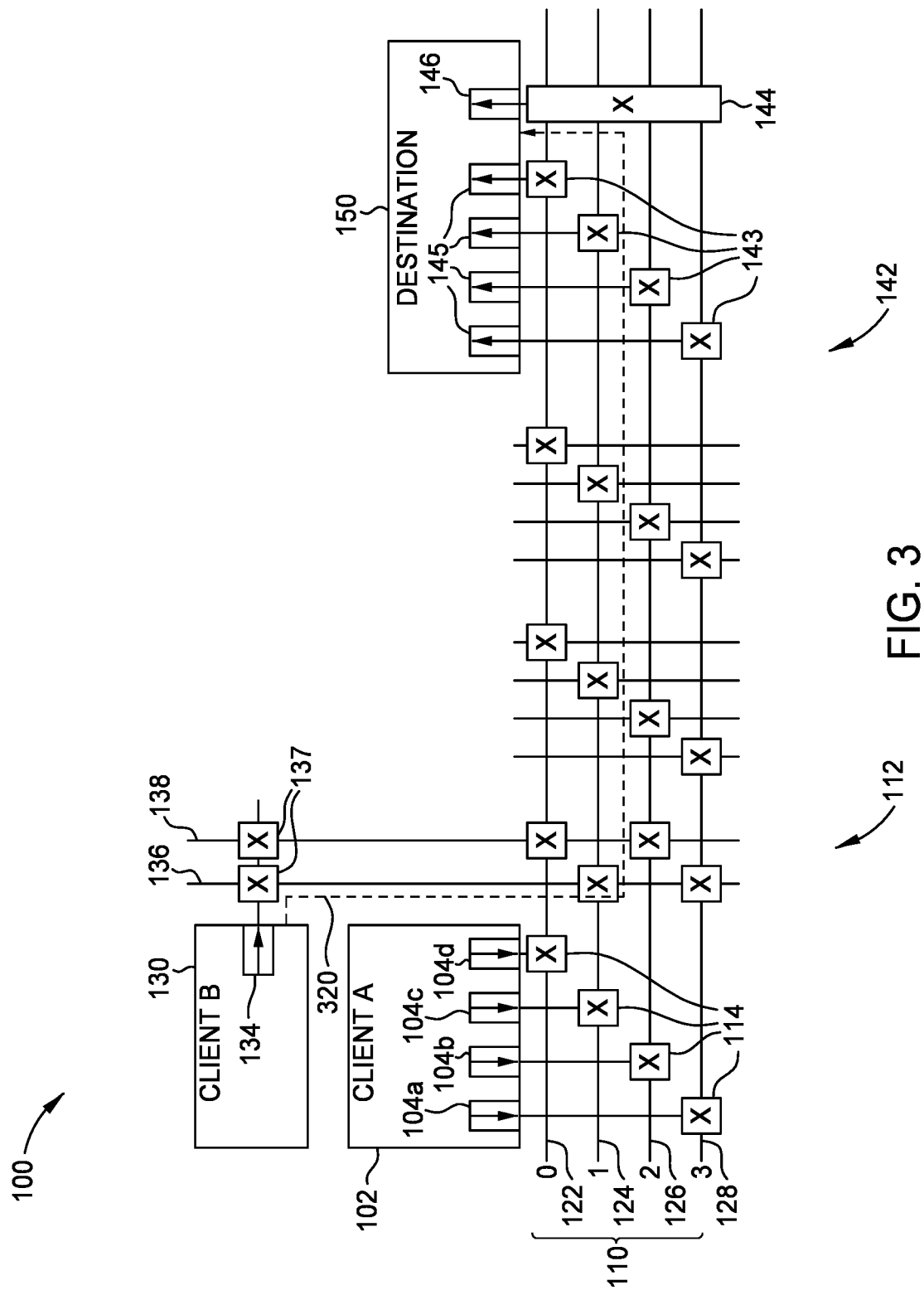
FIG. 3 shows the example system of FIG. 1 with network traffic from a lower bandwidth client to a destination.

FIG. 3 shows the example system 100 with network traffic 320 from lower bandwidth client B 130 to the destination 150, in accordance with an example of the present disclosure. A routing algorithm of the NoC 110 in the example system 100 may route all of the traffic 320 from client B 130 to the destination 150 via a single physical channel, for example, physical channel 124. The routing algorithm may be implemented by software and/or hardware components included in the NMU 134, the NPSs 137 and 144, and the NSU 146. The routing algorithm of the example system 100 may select any single physical channel 122, 124, 126, or 128, and need not select physical channel 124 for the traffic 320 from client B 130 to destination 150.

Figure 4:
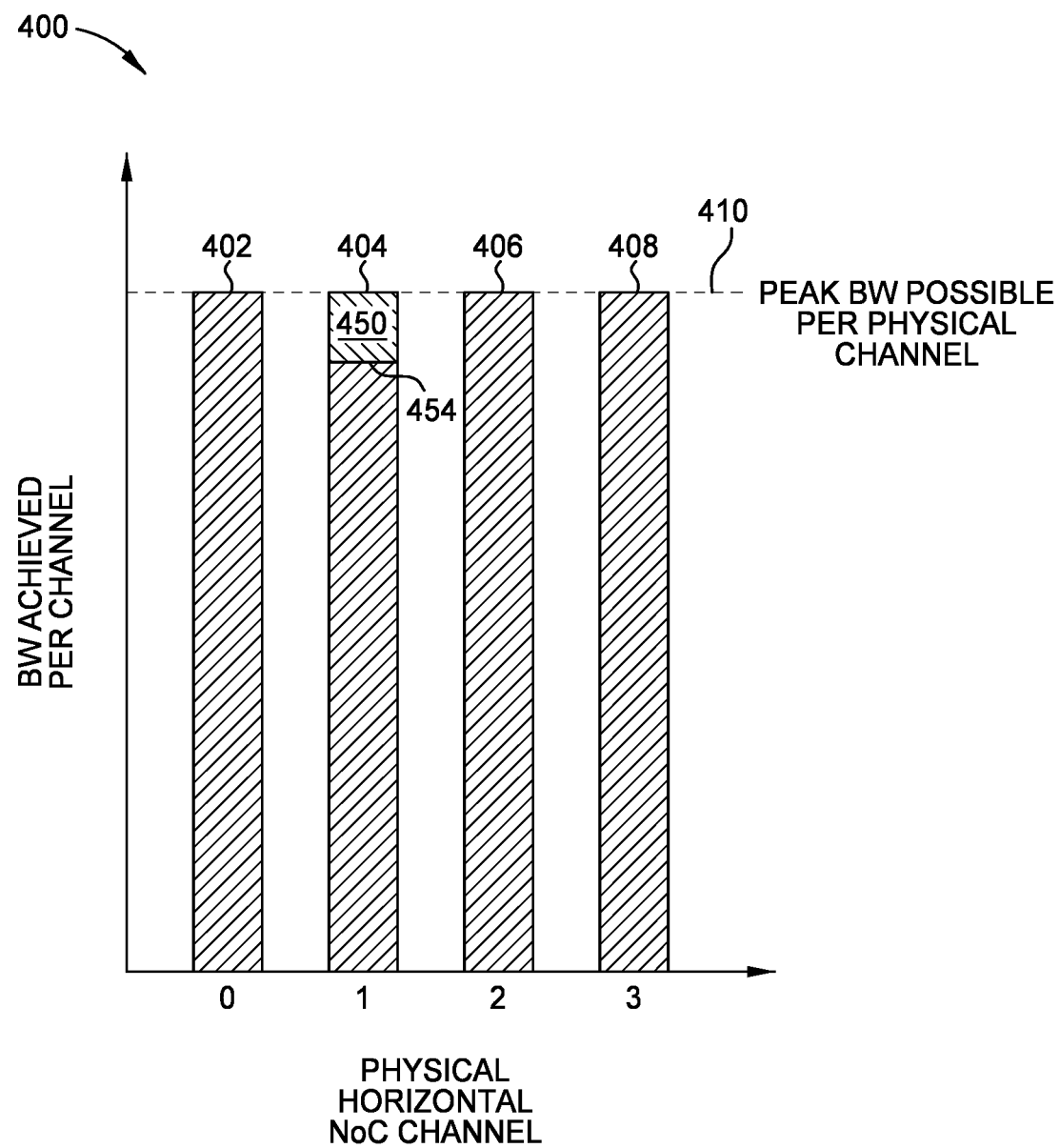
FIG. 4 shows a traffic distribution graph of the system shown in FIG. 3, with perturbation traffic from the lower bandwidth client affecting a single channel.

FIG. 4 shows a traffic distribution graph 400 of network traffic as illustrated in FIG. 3 on the four horizontal NoC physical channels 122, 124, 126, and 128, in accordance with an example of the present disclosure. The bandwidth achieved by the horizontal NoC physical channel 122 (labeled channel "0") is shown at 402. Similarly, the bandwidths achieved by the horizontal NoC physical channels 124, 126, and 128 (labeled channels "1," "2," and "3," respectively) are shown at 404, 406, and 408, respectively. As illustrated, each of the channels 122, 124, 126, and 128 can possibly use close to its peak bandwidth 410, such as 99.5% of the peak bandwidth 410. The network traffic from client A 102 can use the entire bandwidth achieved by each of the physical channels 122, 126, and 128. However, as illustrated in FIG. 3, all of the traffic 320 from client B 130 to the destination 150 is routed via the single physical channel 124. Thus, all of the traffic from client B 130 is shown as utilizing bandwidth 450 on physical horizontal NoC channel 1 (e.g., physical channel 124) in the traffic distribution graph 400, representing a perturbation in the traffic on this channel. Thus, the network traffic from client A 102 uses an amount of bandwidth 454 that is smaller than the peak possible bandwidth 404 achievable by NoC channel 1. That the bandwidth 454 on NoC channel 1 available to the network traffic from client A 102 is smaller than the bandwidths 402, 406, and 408 available on the other NoC channels may cause inefficiencies in the delivery of the network traffic from client A 102 to the destination 150, as well as potentially causing difficulties meeting QoS standards for the network traffic from client A 102 to the destination 150.

Figure 5:
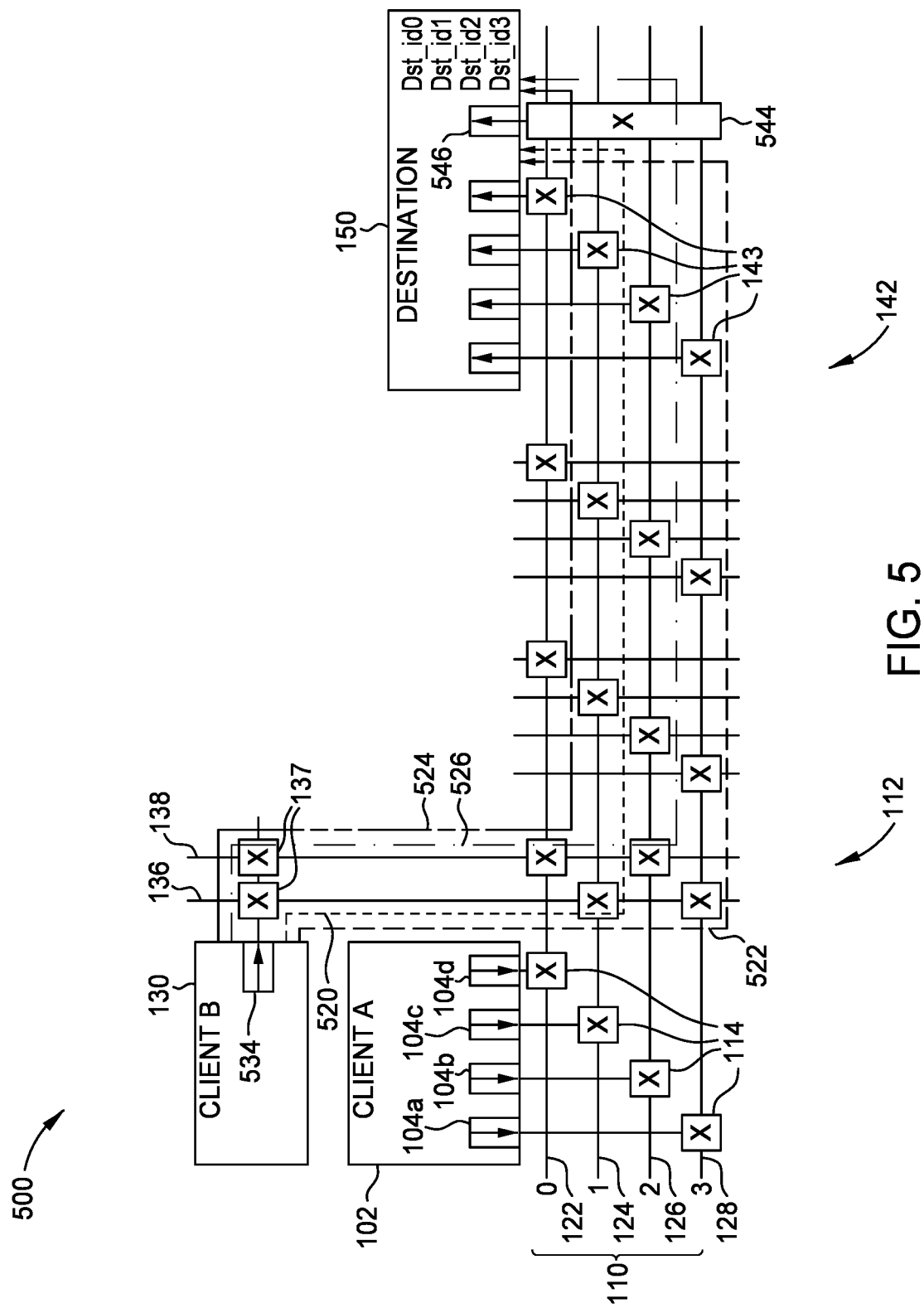
FIG. 5 shows an example of a system including a fully subscribed link aggregated communication with traffic from a lower bandwidth client dispersed across multiple channels, in accordance with an example of the present disclosure.

FIG. 5 shows an example system 500 including a fully subscribed link aggregated communication, in accordance with an example of the present disclosure. System 500 includes many of the same components as system 100 (see FIG. 1), and those components that are unchanged from system 100 are not further described. In the system 500, client A 102 is a higher bandwidth client communicating with the destination 150 via a fully subscribed link aggregated communication and consuming most all (e.g., 99.5%) of the total available bandwidth of the horizontal NoC 110. In the system 500, client B 130 is a lower bandwidth client and can consume a small quantity (e.g., 0.5%) of the available bandwidth. In this example, client B 130 has a network master unit (NMU) 534 connected to the physical channels 122, 124, 126, and 128 via NPS 137 and physical channels 136 and 138 of a vertical NoC. In the example system 500, there is a network slave unit (NSU) 546 in the destination 150 that is connected with all four of the physical channels 122, 124, 126, and 128 via a dedicated NPS 544. In the example system 500, the NSU 546 has four logical destination identifiers (also referred to herein as "logical destination IDs" or "dst_ids") assigned thereto by a routing algorithm of the NoC 110, with each of the logical destination addresses being mapped to a different one of the physical channels 122, 124, 126, or 128. The routing algorithm of the NoC 110 may be implemented in software and/or hardware components of the various NMUs 104 and 534; NPSs 114, 137, 143, and 544; and/or the NSUs 145 and 546.

During operation of the system 500, the NoC compiler (e.g., a routing algorithm of the NoC compiler) assigns one or more logical destination IDs to the physical destination ID of the destination 150. The NoC compiler may determine a number of logical destination IDs to assign to a physical destination ID (e.g., a physical destination ID of an NSU at a destination) based on a maximum number of physical channels that traffic, from a source to a destination (e.g., from an NMU to an NSU), is to be distributed across in the entirety of the NoC path. The NoC compiler (e.g., a routing algorithm of the NoC compiler) also programs routing tables in each NoC protocol switch (NPS) such that each logical destination ID corresponds to a different physical channel 122, 124, 126, or 128 of the NoC. When client B 130 sends traffic to destination 150, the NMU 534 may assign packets of the traffic to the logical destination IDs in a round-robin fashion. Thus, the traffic from client B 130 to destination 150 is divided between the physical channels 122, 124, 126, and 128, so that each physical channel uses a nearly equal amount of bandwidth to carry the traffic from client A 102 to the destination 150. The traffic from client B 130 to destination 150 is represented at 520, 522, 524, and 526. By dividing the traffic from client B 130 to destination 150 across all of the physical channels of the NoC, the NoC reduces the impact on the communications from bandwidth-sensitive client A 102 to destination 150.

While the example system 500 shown in FIG. 5 includes four physical channels 122, 124, 126, and 128, the present disclosure is not so limited, and aspects of the present disclosure are applicable to NoCs aggregating two or more physical channels.

Figure 6:
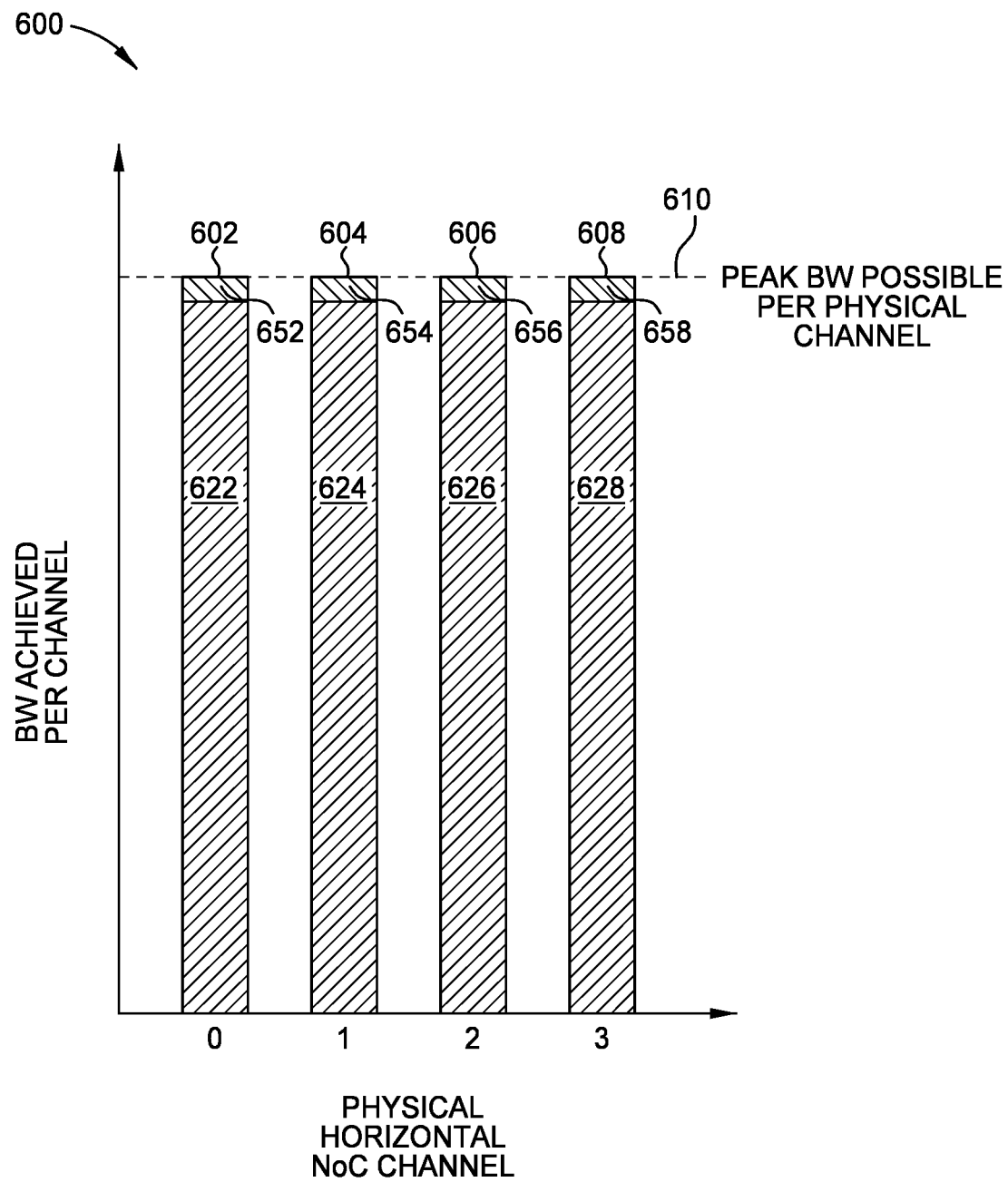
FIG. 6 shows a traffic distribution graph of the system shown in FIG. 5, with distributed perturbation traffic in accordance with an example of the present disclosure.

FIG. 6 shows a traffic distribution graph 600 of network traffic as illustrated in FIG. 5 on the four horizontal NoC physical channels 122, 124, 126, and 128, in accordance with an example of the present disclosure. The bandwidth used by the horizontal NoC physical channel 122 is shown at 602. Similarly, the bandwidths used by the horizontal NoC physical channels 124, 126, and 128 are shown at 604, 606, and 608, respectively. As illustrated, each of the channels 122, 124, 126, and 128 can use close to its peak bandwidth 610, such as 99.5% of the peak bandwidth 610. The network traffic from client A 102 to the destination 150 uses the quantities of network bandwidth shown at 622, 624, 626, and 628. The network traffic from client A 102 can use most of the bandwidth available in each of the physical channels 122, 124, 126, and 128. However, as illustrated in FIG. 5, the traffic 520, 522, 524, and 526 from client B 130 to the destination 150 is also dispersed among the physical channels 122, 124, 126, and 128. Thus, the amounts of bandwidth used by the traffic from client B 130 are shown at 652, 654, 656, and 658 in the traffic distribution graph 600. In this manner, the amounts of bandwidth used for the network traffic from client A 102 to the destination 150 are essentially equal (e.g., bandwidth-sensitive traffic is uniformly distributed), and so the NoC 110 may avoid experiencing the inefficiencies and difficulties in meeting QoS standards that can occur when there are differences in the amounts of bandwidth used for bandwidth-sensitive traffic on each of the physical channels.

Figure 7:
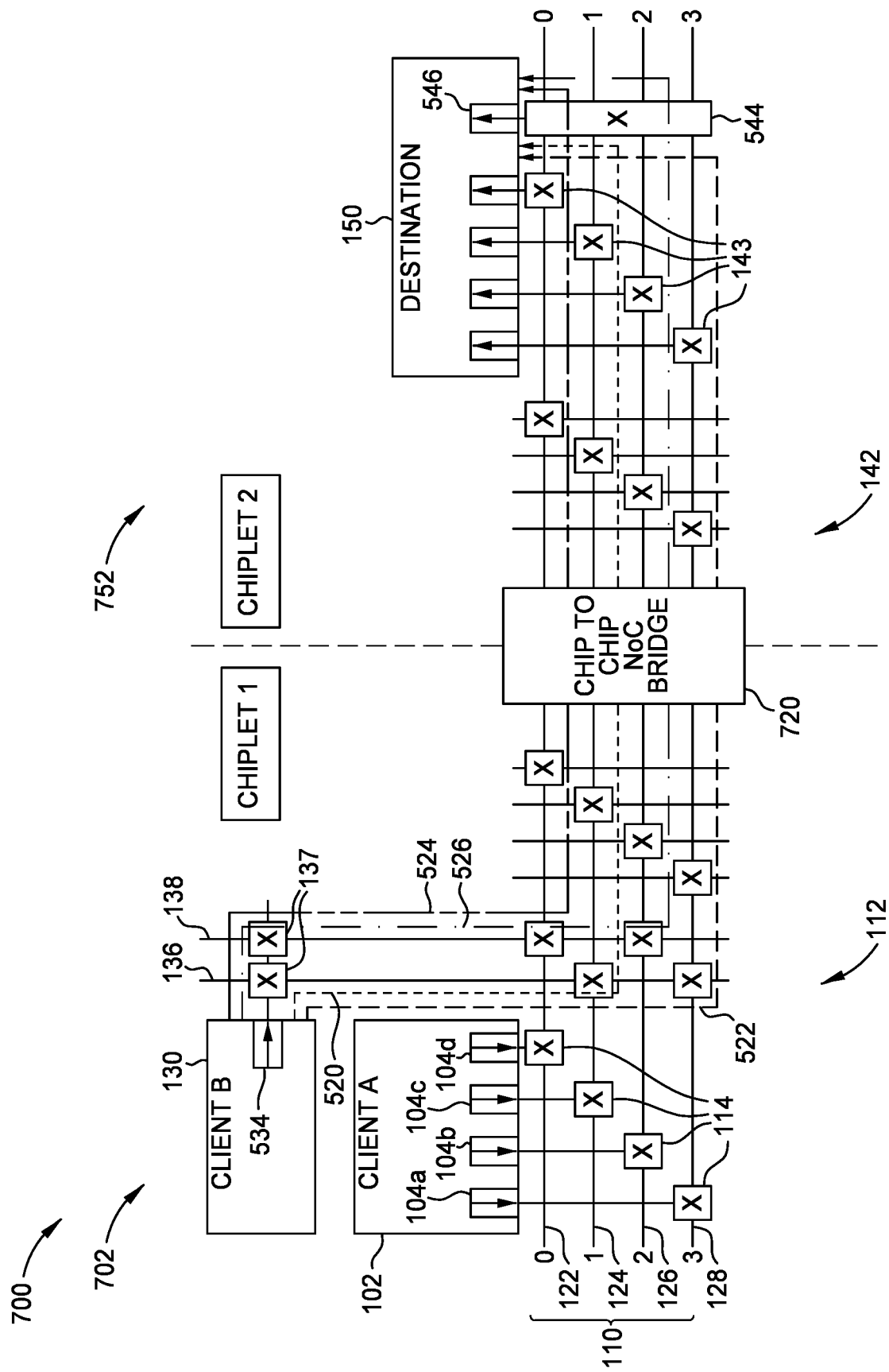
FIG. 7 shows an example system including chiplets with distributed traffic from a lower bandwidth client, in accordance with an example of the present disclosure.

FIG. 7 shows an example system 700 including two chiplets 702 and 752 with a fully subscribed link aggregated communication, in accordance with an example of the present disclosure. System 700 includes many of the same components as system 500 (see FIG. 5), and those components which are unchanged from system 500 are not further described. In the system 700, client A 102 and client B 130 are located on chiplet 702, while destination 150 is located on chiplet 752. The NoC 110 includes a chip-to-chip NoC bridge 720, which connects portions of the NoC 110 that are located on chiplet 702 with portions of the NoC 110 that are located on chiplet 752. Therefore, the chiplet 702 may communicate with chiplet 752, and vice versa, via the chip-to-chip NoC bridge 720. In some examples, the portion of the chip-to-chip NoC bridge 720 located on the chiplet 702 may communicate with the portion of the chip-to-chip NoC bridge 720 on the chiplet 752 using a chiplet interface protocol. Network traffic on the NoC 110 may be encapsulated when being communicated over the chip-to-chip NoC bridge 720, and NoC attributes may be tunneled across the chip-to-chip NoC bridge 720.

Figure 8:
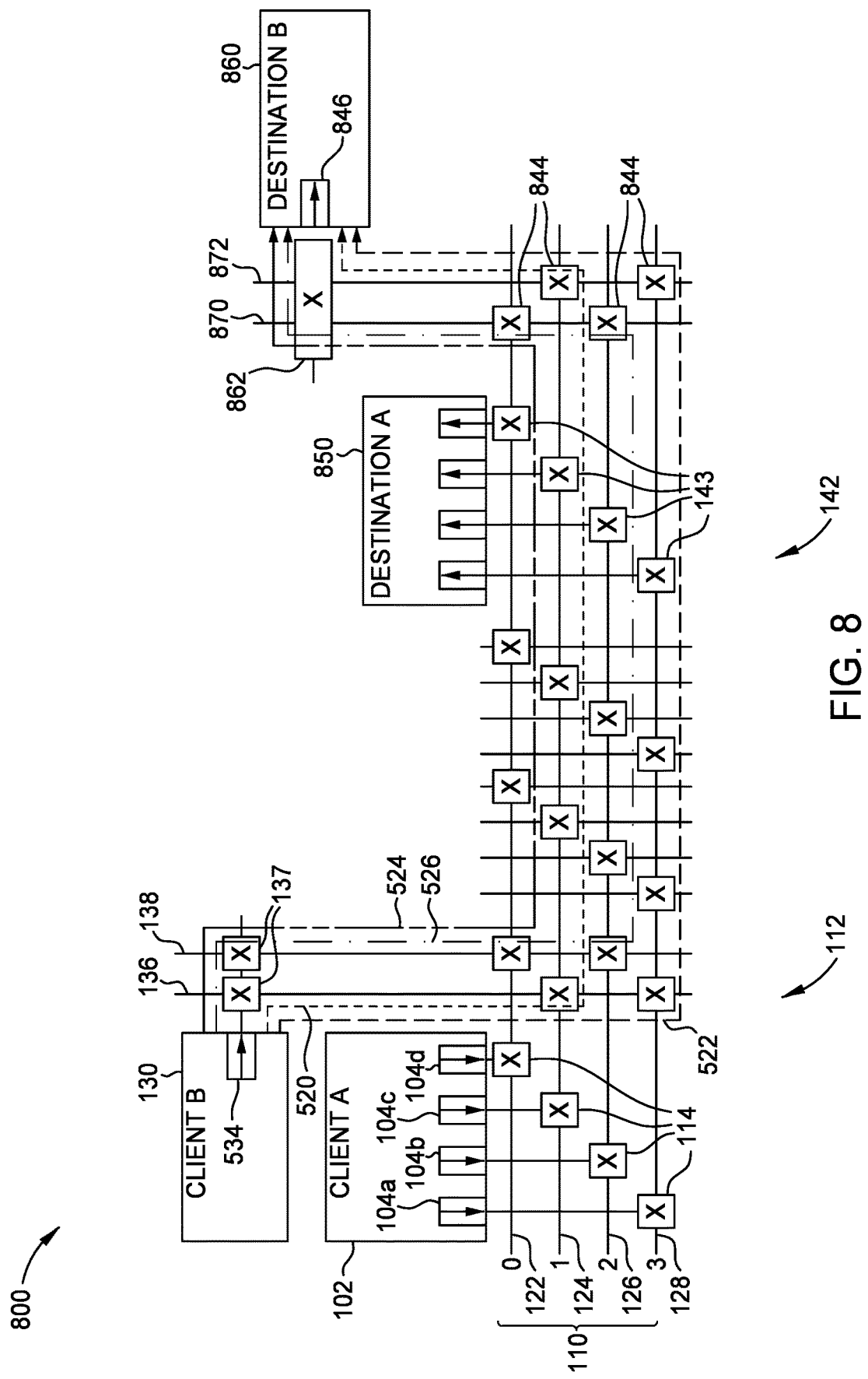
FIG. 8 shows an example of a system including a fully subscribed link aggregated communication and communication from a lower bandwidth client to another destination, in accordance with an example of the present disclosure.

FIG. 8 shows an example system 800 including a fully subscribed link aggregated communication, in accordance with an example of the present disclosure. System 800 includes many of the same components as system 500 (see FIG. 5), and those components which are unchanged from system 500 are not further described. In the system 800, client A 102 is a higher bandwidth client communicating with the destination A 850 via a fully subscribed link aggregated communication and consuming nearly all (e.g., 99.5%) of the total available bandwidth of the horizontal NoC 110. In the system 800, client B 130 is a lower bandwidth client that is communicating with destination B 860 and can consume a small quantity (e.g., 0.5%) of the available bandwidth. In the system 800, there is a network slave unit (NSU) 846 in the destination B 860 that is connected via an NPS 862 with physical channels 870 and 872 of a vertical NoC. The NPS 862 and the physical channels 870 and 872 of the vertical NoC are coupled to all four of the physical channels 122, 124, 126, and 128 via NPSs 844. In the example system 800, the NSU 846 has four logical destination IDs assigned thereto by a network compiler (e.g., a routing algorithm of the network compiler) of the NoC 110, with each of the logical destination IDs being mapped to a different one of the physical channels 122, 124, 126, or 128. As previously described, the NoC compiler may determine a number of logical destination IDs to assign to a physical destination ID (e.g., an NSU at a destination) based on a maximum number of physical channels that traffic, from a source to a destination (e.g., from an NMU to an NSU), is to be distributed across in the entirety of the NoC path. Two of the logical destination IDs may be mapped (by the routing algorithm) to the physical channel 870 of the vertical NoC, and the other two logical destination IDs may be mapped to the physical channel 872. The routing algorithm of the NoC 110 may be implemented in software and/or hardware components of the various NMUs 104 and 534; NPSs 114, 137, 143, 844, and 862; and/or the NSUs 145 and 846.

During operation of the system 800, the NoC compiler (e.g., a routing algorithm of the NoC compiler) assigns one or more logical destination ID(s) to the physical destination ID of the destination B 860. The NoC compiler may determine a number of logical destination IDs to assign to a physical destination ID (e.g., a physical destination ID of an NSU at a destination) based on a maximum number of physical channels that traffic, from a source to a destination (e.g., from an NMU to an NSU), is to be distributed across in the entirety of the NoC path. The NoC compiler (e.g., a routing algorithm of the NoC compiler) also programs routing tables in at least relevant NPSs such that each logical destination ID corresponds to a different physical channel 122, 124, 126, or 128 of the NoC. When client B 130 sends traffic to destination B 860, the NMU 534 may assign each packet of the traffic to the logical destination IDs in a round-robin fashion, for example. Thus, the traffic from client B 130 to destination B 860 is divided between the physical channels 122, 124, 126, and 128, so that each physical channel uses a nearly equal amount of bandwidth to carry the traffic from client A 102 to the destination A 850. The traffic from client B 130 to destination B 860 is represented at 520, 522, 524, and 526. By dividing the traffic from client B 130 to destination B 860 across all of the physical channels of the horizontal NoC 110, the horizontal NoC 110 reduces the impact on the communications from client A 102 to destination A 850 (e.g., without perturbation from traffic from client B 130).

Figure 9:
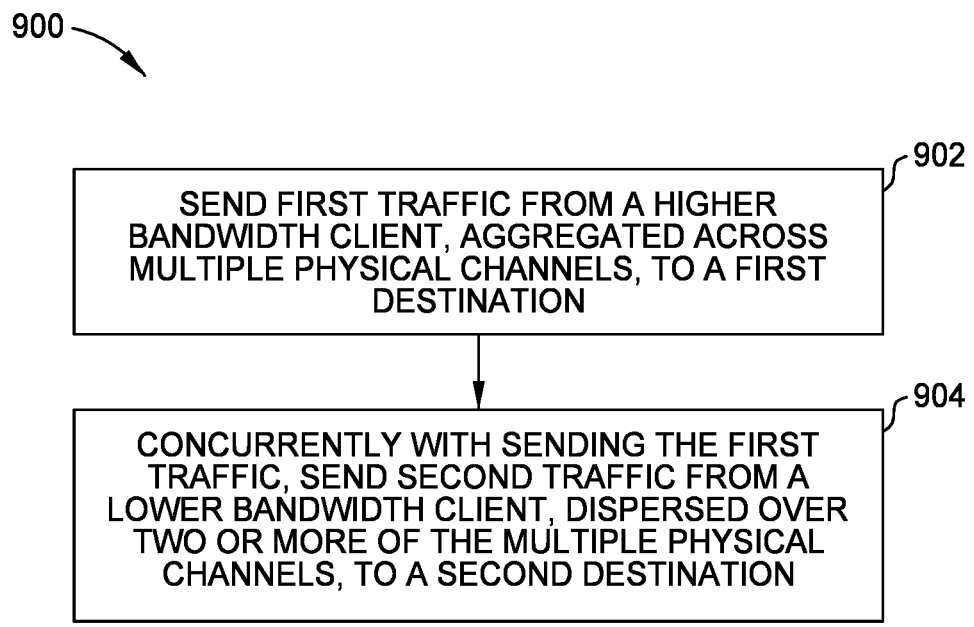
FIG. 9 depicts a flow diagram of a method of communication, in accordance with an example of the present disclosure.

FIG. 9 depicts a flow diagram of example operations 900 for transmission, in accordance with an example of the present disclosure. The operations 900 may be performed by an electronic device, such as the systems 500, 700, and 800 of FIGS. 5, 7, and 8, respectively. The flow diagram includes blocks representing the operations 900.

The operations 900 may begin, at block 902, by sending first traffic from a higher bandwidth client (e.g., a bandwidth-sensitive client) to a first destination. This first traffic may be aggregated across multiple physical channels (e.g., in a fully subscribed link aggregated communication). In some examples, this operation at block 902 corresponds to sending first traffic from client A 102, aggregated across physical channels 122, 124, 126, and 128, to destination 150, as shown in FIGS. 5 and 7. In other examples, this corresponds to sending first traffic from client A 102, aggregated across physical channels 122, 124, 126, and 128, to destination A 850, as shown in FIG. 8.

At block 904, the system sends, concurrently with sending the first traffic at block 902, second traffic from a lower bandwidth client to a second destination. The second traffic is dispersed over two or more of the multiple physical channels. The second destination may be the same destination as the first destination or may be a different destination. In some examples, this operation at block 904 corresponds to, concurrently with sending the first traffic from client A 102 to the destination 150, sending second traffic from the client B 130, dispersed over two or more of the physical channels, 122, 124, 126, or 128, to the destination 150, shown in FIGS. 5 and 7. In other examples, this corresponds to, concurrently with sending the first traffic from client A 102 to the destination A 850, sending second traffic from the client B 130, dispersed over two or more of the physical channels, 122, 124, 126, or 128, to the destination B 860, shown in FIG. 8.

According to some examples, sending the second traffic at block 904 may include sending the second traffic distributed equally across the multiple physical channels (e.g., the physical channels 122, 124, 126, and 128 shown in FIGS. 5, 7, and 8).

According to some examples, the second destination (e.g., destination 150 or destination B 860, shown in one of FIGS. 5, 7, and 8) may be unaware of the dispersion (of the second traffic) over the two or more of the multiple physical channels (e.g., the physical channels 122, 124, 126, and 128 shown in FIGS. 5, 7, and 8).

According to some examples, the higher bandwidth client (e.g., client A 102, shown in FIGS. 5, 7, and 8) may include a higher bandwidth network-on-a-chip (NoC) client, the lower bandwidth client (e.g., client B 130, shown in FIGS. 5, 7, and 8) may include a lower bandwidth NoC client, at least one of the first destination or the second destination (e.g. destination 150, destination A 850, or destination B 860, shown in one of FIGS. 5, 7, and 8) may include a NoC destination, and the multiple physical channels (e.g., physical channels 122, 124, 126, and 128, shown in FIGS. 5, 7, and 8) may include multiple NoC channels.

According to some examples, the higher bandwidth client (e.g. client A 102, shown in FIGS. 5, 7, and 8) may reside on a first chiplet (e.g., chiplet 702), the lower bandwidth client (e.g., client B 130, shown in FIGS. 5, 7, and 8) may reside on a second chiplet (e.g., chiplet 752), at least one of the first destination or the second destination (e.g., destination 150, destination A 850, or destination B 860, shown in one of FIGS. 5, 7, and 8) may reside on a destination chiplet, and the multiple physical channels (e.g., physical channels 122, 124, 126, and 128, shown in FIGS. 5, 7, and 8) may include chiplet-to-chiplet channels.

According to some examples, sending the second traffic in block 904 may include maintaining in-order delivery of the second traffic to the second destination (e.g., destination 150 or destination B 860, shown in one of FIGS. 5, 7, and 8).

According to some examples, the multiple physical channels (e.g., physical channels 122, 124, 126, and 128, shown in FIGS. 5, 7, and 8) may have similar latency and similar throughput when concurrently sending the first traffic to the first destination in block 902 and the second traffic to the second destination in block 904 (e.g., destination 150 or destination B 860, shown in one of FIGS. 5, 7, and 8).

According to some examples, in the operations 900 a physical destination identifier (ID) may be associated with the second destination (e.g., destination 150 or destination B 860, shown in FIGS. 5, 7, and 8). Furthermore, sending the second traffic in block 904 may include sending the second traffic from a source port (e.g., NMU 534, shown in FIGS. 5, 7, and 8) of the lower bandwidth client (e.g., client B 130, shown in FIGS. 5, 7, and 8) to multiple distinct logical destination IDs, each logical destination ID being associated with a different one of the multiple physical channels (e.g., physical channels 122, 124, 126, and 128, shown in FIGS. 5, 7, and 8); and sending the first traffic in block 902 may include sending the first traffic from multiple source ports (e.g., NMUs 104, shown in FIGS. 5, 7, and 8) of the higher bandwidth client (e.g., client A 102, shown in FIGS. 5, 7, and 8) to the first destination (e.g., destination 150 or destination A 850, shown in one of FIGS. 5, 7, and 8), each source port being associated with a different one of the multiple physical channels (e.g., physical channels 122, 124, 126, and 128, shown in FIGS. 5, 7, and 8). In some such examples, the operations 900 may further include reassembling the second traffic of block 904, received at the second destination (e.g., destination 150 or destination B 860, shown in one of FIGS. 5, 7, and 8) via the multiple physical channels (e.g., physical channels 122, 124, 126, and 128, shown in FIGS. 5, 7, and 8), using the logical destination IDs.

According to some examples, sending the second traffic in block 904 may include routing the second traffic via multiple switches (e.g., NPSs 137, 143, 544, 844, and 862, shown in FIGS. 5, 7, and 8) using a routing table stored in each of the multiple switches. Each switch may be coupled between a source port (e.g., NMU 534, shown in FIGS. 5, 7, and 8) of the lower bandwidth client (e.g., client B 130, shown in FIGS. 5, 7, and 8) and a different one of the multiple physical channels (e.g., physical channels 122, 124, 126, and 128, shown in FIGS. 5, 7, and 8).

In the preceding, reference is made to examples presented in this disclosure. However, the scope of the present disclosure is not limited to specific described examples. Instead, any combination of the described features and elements, whether related to different examples or not, is contemplated to implement and practice contemplated examples. Furthermore, although examples disclosed herein may achieve advantages over other possible solutions or over the prior art, whether or not a particular advantage is achieved by a given example is not limiting of the scope of the present disclosure. Thus, the preceding aspects, features, embodiments, and advantages are merely illustrative and are not considered elements or limitations of the attached claims except where explicitly recited in one or more of the claims.

As will be appreciated by one skilled in the art, the examples disclosed herein may be embodied as a system, method, or apparatus, and the like. Accordingly, examples may take the form of an entirely hardware embodiment, a combination of hardware products, or an embodiment combining hardware aspects with corresponding programming that may all generally be referred to herein as "circuitry" or a "system." Furthermore, certain aspects, such as programmable logic blocks, lookup tables (LUTs), and the like, may take the form of hardware components that can be controlled using corresponding programming.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the context of this document, a computer-readable storage medium is any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electrical, magnetic, optical, electromagnetic, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless (e.g., radio frequency (RF) or infrared), wireline, optical fiber or cable, etc., or any suitable combination of the foregoing.

Computer program code for carrying out operations or programming for examples of the present disclosure may be written in any combination of one or more programming languages, including an object oriented programming language such as Java, Smalltalk, C++ or the like and procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Examples of the present disclosure are described herein with reference to flowchart illustrations and/or block diagrams of methods, apparatus (e.g., systems), and computer program products presented herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer-implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and apparatus according to various examples of the present disclosure. In this regard, each block in the flowchart or block diagrams may represent circuitry, programming for such circuitry, or portion of instructions for such circuitry, which comprises one or more executable instructions for controlling or programming the circuitry to perform the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

The invention claimed is:

1. A method of transmission, comprising:
    sending first traffic from a higher bandwidth client, aggregated across multiple physical channels, to a first destination; and
    concurrently with sending the first traffic, sending second traffic from a lower bandwidth client, dispersed over two or more of the multiple physical channels, to a second destination, the second traffic from the lower bandwidth client divided between the multiple physical channels so that the multiple physical channels use an equal amount of bandwidth to carry the first traffic from the high bandwidth client to the first destination.

2. The method of claim 1, wherein dividing the second traffic, when concurrently sending the first traffic and the second traffic across the multiple physical channels, reduces an impact of communications from the high bandwidth client to the first destination.

3. The method of claim 1, wherein each of the multiple physical channels carries both the first traffic and the second traffic.

4. The method of claim 1, wherein the higher bandwidth client comprises a higher bandwidth network-on-a-chip (NoC) client, wherein the lower bandwidth client comprises a lower bandwidth NoC client, wherein at least one of the first destination or the second destination comprises a NoC destination, and wherein the multiple physical channels comprise multiple NoC channels.

5. The method of claim 1, wherein the higher bandwidth client resides on a first chiplet, wherein the lower bandwidth client resides on a second chiplet, wherein at least one of the first destination or the second destination resides on a destination chiplet, and wherein the multiple physical channels comprise chiplet-to-chiplet channels.

6. The method of claim 1, wherein sending the second traffic comprises maintaining in-order delivery of the second traffic to the second destination.

7. The method of claim 1, wherein the multiple physical channels have similar latency and similar throughput when concurrently sending the first traffic to the first destination and the second traffic to the second destination.

8. The method of claim 1, wherein:
 a physical destination identifier (ID) is associated with the second destination;
 sending the second traffic comprises sending the second traffic from a source port of the lower bandwidth client to multiple distinct logical destination IDs, each logical destination ID being associated with a different one of the multiple physical channels; and
 sending the first traffic comprises sending the first traffic from multiple source ports of the higher bandwidth client to the first destination, each source port being associated with a different one of the multiple physical channels.

9. The method of claim 8, further comprising reassembling the second traffic, received at the second destination via the multiple physical channels, using the logical destination IDs.

10. The method of claim 1, wherein the sending the second traffic comprises routing the second traffic via multiple switches using a routing table stored in each of the multiple switches, each switch being coupled between a source port of the lower bandwidth client and a different one of the multiple physical channels.

11. An apparatus comprising:
 a higher bandwidth client;
 a lower bandwidth client;
 a first destination;
 a second destination; and
 multiple physical channels coupled between the higher bandwidth client, the lower bandwidth client, the first destination, and the second destination, wherein:
  the higher bandwidth client sends first traffic, aggregated across the multiple physical channels, to the first destination; and
  the lower bandwidth client sends second traffic, concurrently with sending the first traffic, from the lower bandwidth client, dispersed over two or more of the multiple physical channels, to the second destination, the second traffic from the lower bandwidth client divided between the multiple physical channels so that the multiple physical channels use an equal amount of bandwidth to carry the first traffic from the high bandwidth client to the first destination.

12. The apparatus of claim 11, wherein dividing the second traffic, when concurrently sending the first traffic and the second traffic across the multiple physical channels, reduces an impact of communications from the high bandwidth client to the first destination.

13. The apparatus of claim 11, wherein each of the multiple physical channels carries both the first traffic and the second traffic.

14. The apparatus of claim 11, wherein the apparatus comprises a network-on-a-chip (NoC), wherein the higher bandwidth client comprises a higher bandwidth NoC client, wherein the lower bandwidth client comprises a lower bandwidth NoC client, wherein at least one of the first destination or the second destination comprises a NoC destination, and wherein the multiple physical channels comprise multiple NoC channels.

15. The apparatus of claim 11, wherein the higher bandwidth client resides on a first chiplet, wherein the lower bandwidth client resides on a second chiplet, wherein at least one of the first destination or the second destination resides on a destination chiplet, and wherein the multiple physical channels comprise chiplet-to-chiplet channels.

16. The apparatus of claim 11, wherein the lower bandwidth client sends the second traffic with logical destination identifiers (IDs), and wherein the second destination maintains in-order delivery of the second traffic based on the logical destination IDs.

17. The apparatus of claim 11, wherein:
 a physical destination identifier (ID) is associated with the second destination;
 the lower bandwidth client comprises a source port to send the second traffic to multiple distinct logical destination IDs, each logical destination ID being associated with a different one of the multiple physical channels; and
 the higher bandwidth client comprises multiple source ports to send the first traffic to the first destination, each of the multiple source ports being associated with a different one of the multiple physical channels.

18. The apparatus of claim 17, wherein the second destination further reassembles the second traffic, received at the second destination via the multiple physical channels, using the logical destination IDs.

19. The apparatus of claim 11, further comprising a plurality of switches, wherein:
 the lower bandwidth client comprises a source port;
 each of the switches is coupled between the source port of the lower bandwidth client and a different one of the multiple physical channels; and
 each of the switches stores a routing table and to route the second traffic using the routing table.

20. The apparatus of claim 11, wherein the multiple physical channels have similar latency and similar throughput when the higher and lower bandwidth clients concurrently send the first traffic to the first destination and the second traffic to the second destination.

* * * * *